Dec. 30, 1952  R. S. PALERMO  2,623,540
SPRING CHECK VALVE
Filed May 1, 1950
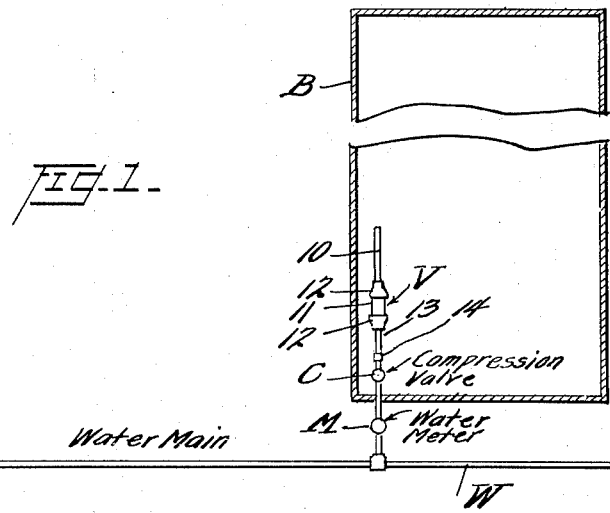
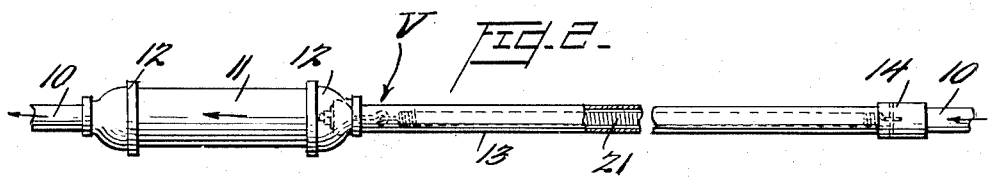
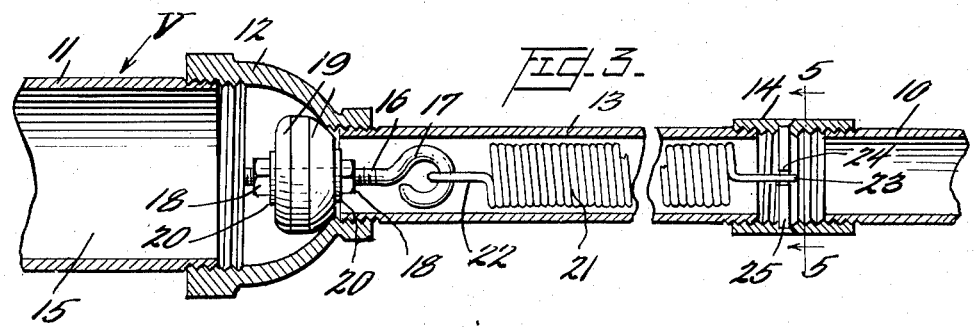
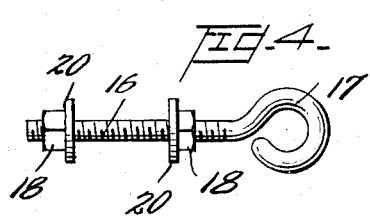
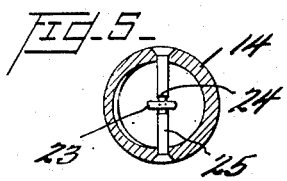
INVENTOR,
*Rafael Soltero Palermo,*
BY *Ivan P. Lashof,*
ATTORNEY Patented Dec. 30, 1952

2,623,540

UNITED STATES PATENT OFFICE 2,623,540

SPRING CHECK VALVE

Rafael Soltero Palermo, Arecibo, P. R.

Application May 1, 1950, Serial No. 159,302

2 Claims. (Cl. 137—515)

This invention relates to water valves and has special reference to a waste-preventing water valve which is preferably termed an automatic safety water valve.

One important object of this invention is to provide on the house or building side of a water meter and distant from all outlets a valve which will automatically open when water is drawn from the supply line and automatically close upon cessation of use of water from said supply line.

A second important object of the invention is to provide an automatically closing water valve adopted to prevent loss of water caused by leaking taps, spigots and other valves used to control the use of water from such a supply line.

A third important object of this invention is to provide in such a valve a reducing pipe connection arranged to constitute a valve seat upon closing of the valve.

With the above and other objects in view, as will be presently apparent, the invention consists in general of certain novel details of construction and combinations of parts hereinafter fully described, illustrated in the accompanying drawings and particularly classified.

In the drawings like characters of reference indicate like parts in the several views, and:

Fig. 1 is a view partly in elevation and partly in section and showing the relation of this valve to a water meter;

Fig. 2 is an enlarged view showing the valve of this invention partly in elevation and partly in section and illustrating the arrangement of the valve and its relation to an inlet pipe and a fixture supply pipe;

Fig. 3 is a greatly enlarged section partly broken away, the section being taken diametrically through the valve and disclosing the working parts;

Fig. 4 is a detail showing of spring connecting member used herein;

Fig. 5 is a section on the line 5—5 of Fig. 3.

In Fig. 1 of the drawings the invention is shown in connection with a building B, a water main W connected to a meter M. In this connection is also provided a cut-off valve C as is usual in such installations.

Leading from the cut-off valve C is the building supply line 10 and interposed in this line close to the valve C is the valve forming the subject of the present invention and here indicated in general at V.

Referring now especially to Figs. 2 and 3, it will be seen that the valve includes a pipe body 11 on each end of which is screwed a reducing fitting 12. In the fitting 12 nearer the valve C is screwed a nipple 13 on which is screwed a coupling 14. The coupling 14 is connected to what may be termed the intake section of the supply line 10, the outflow of this line 10 from the valve being connected to the remaining reducing fitting 12. The body 11 thus provides a valve chamber 15 of large diameter relative to the internal diameter of the nipple 13.

The valve proper or plug is provided with a threaded stem 16 having at one end an eye 17. Screwed on the stem 16 is a pair of nuts 18 between which is located a plurality of washers 19 of leather or other yieldable material. These washers are gripped on each side by a rigid metal washer 20 engaged by the respective nut 18. At least one of the washers 19 is rounded to fit neatly against the inner surface of the fitting 12 to which the nipple 13 is attached. A coiled tension spring 21 has an eye 22 formed at one end and engaged with the eye 17. At its other end the spring 21 has an eye 23 extending around a reduced portion 24 formed centrally of a pin 25 extending through the coupling 14 and riveted in the walls of said coupling.

In use, whenever any of the fixtures supplied by the line 11 on the house side of this valve is opened, the plug will lift off of the seat formed by the inner surface of the fitting 12 and water will flow freely through the valve since the space around the plug in the valve body 11 is greater than the cross-sectional areas of the nipple 13 and pipe 10. As soon as the open fixture closes, the spring 21, aided by the pressure of water in the chamber 15, will cause the plug to seat firmly in the fitting 12 and thus stop further flow even if a leakage exists in a fitting supplied by the line 10.

Instead of using leather washers, rubber washers may be used. The use of a valve composed of leather or rubber washers insures a leakproof connection, and especially so when the leather washers are used, since these absorb a certain amount of water and expand to form a substantially leakproof valve closure.

What is claimed is:

1. In a valve for the purpose described a valve body of tubular form, reducing fittings screwed on the ends of said body, a nipple screwed into the smaller end of one of said fittings, a valve plug having a yieldable central portion seated normally against the interior surface of the last mentioned fitting intermediate its ends, said plug consisting of a threaded stem, a plurality of leather washers in abutting relation mounted on said stem, said washers collectively having a shape approximating that of the reducing fitting at the smaller end thereof, a pair of rigid washers at each side of the plurality of leather washers and nuts on opposite ends of the stem adjacent the rigid washers, one end of said stem projecting freely through the smaller end of said reducing fitting and having an eye thereon, a pipe coupling screwed on said nipple, a pin extending diametrically through said coupling, and a tension spring having one end connected to said eye and its other end connected to said pin.

2. In a valve for the purpose described a valve body of tubular form, reducing fittings screwed on the ends of said body, a nipple screwed into the smaller end of one of said fittings, a valve plug having a yieldable central portion seated normally against the interior surface of the last mentioned fitting intermediate its ends, said plug consisting of a threaded stem, a plurality of leather washers in abutting relation mounted on said stem, said washers collectively having a shape approximating that of the reducing fitting at the smaller end thereof, a pair of rigid washers at each side of the plurality of leather washers and nuts on opposite ends of the stem adjacent the rigid washers, one end of said stem projecting freely through the smaller end of said reducing fitting and having an eye thereon, a pipe coupling screwed on said nipple, a pin extending diametrically through said coupling having centrally thereof a reduced portion, and a tension spring having one end connected to said eye and the other end to the reduced portion of said pin.

RAFAEL SOLTERO PALERMO.

REFERENCES CITED

The following references are of record in the file of this patent:

UNITED STATES PATENTS

| Number | Name | Date |
|---|---|---|
| 136,007 | Sarsfield | Feb. 18, 1873 |
| 519,430 | Leidich | May 8, 1894 |
| 603,592 | Buckingham | May 3, 1898 |
| 1,238,926 | Long | Sept. 4, 1917 |
| 1,661,986 | Yetter | Mar. 6, 1928 |
| 2,170,478 | Long et al. | Aug. 22, 1939 |
| 2,393,464 | Granberg | Jan. 22, 1946 |